United States Patent [19]

Scholz et al.

[11] 4,176,437

[45] Dec. 4, 1979

[54] METHOD OF REPAIRING A DEFECTIVE COATED WORKPIECE

[75] Inventors: Manfred Scholz, Hürth-Hermülheim; Lothar Strie, Bornheim-Merten; Karl-Heinz Stendenbach, Erftstadt, all of Fed. Rep. of Germany

[73] Assignee: Hoechst Aktiengesellschaft, Frankfurt am Main, Fed. Rep. of Germany

[21] Appl. No.: 897,674

[22] Filed: Apr. 19, 1978

[30] Foreign Application Priority Data

Apr. 23, 1977 [DE] Fed. Rep. of Germany ....... 2718238

[51] Int. Cl.² .......................... B23P 7/00; B32B 35/00
[52] U.S. Cl. ............................... 29/402.12; 29/402.15; 85/1 JP; 220/235; 220/233; 220/327; 220/213

[58] Field of Search ............. 29/401 E, 401 D, 401 C; 220/235, 236, 327, 328, 378, 234, 287, 295, 213, 233, 308; 85/1 JP

[56] References Cited

U.S. PATENT DOCUMENTS 2,917,819  12/1959  Britton et al. ..................... 85/1 JP
3,236,407  2/1966  Zelman et al. ..................... 29/401

Primary Examiner—Francis S. Huser
Assistant Examiner—V. K. Rising
Attorney, Agent, or Firm—Connolly and Hutz

[57] ABSTRACT

Defective coated workpieces are repaired. To this end a coated plate is placed on to the defective area so as to cover and overlap the defective area. A seal is disposed between the defective area and the plate and the latter is secured by means of bolts or screws extending through the workpiece from the uncoated side and extending into the plate.

5 Claims, 1 Drawing Figure

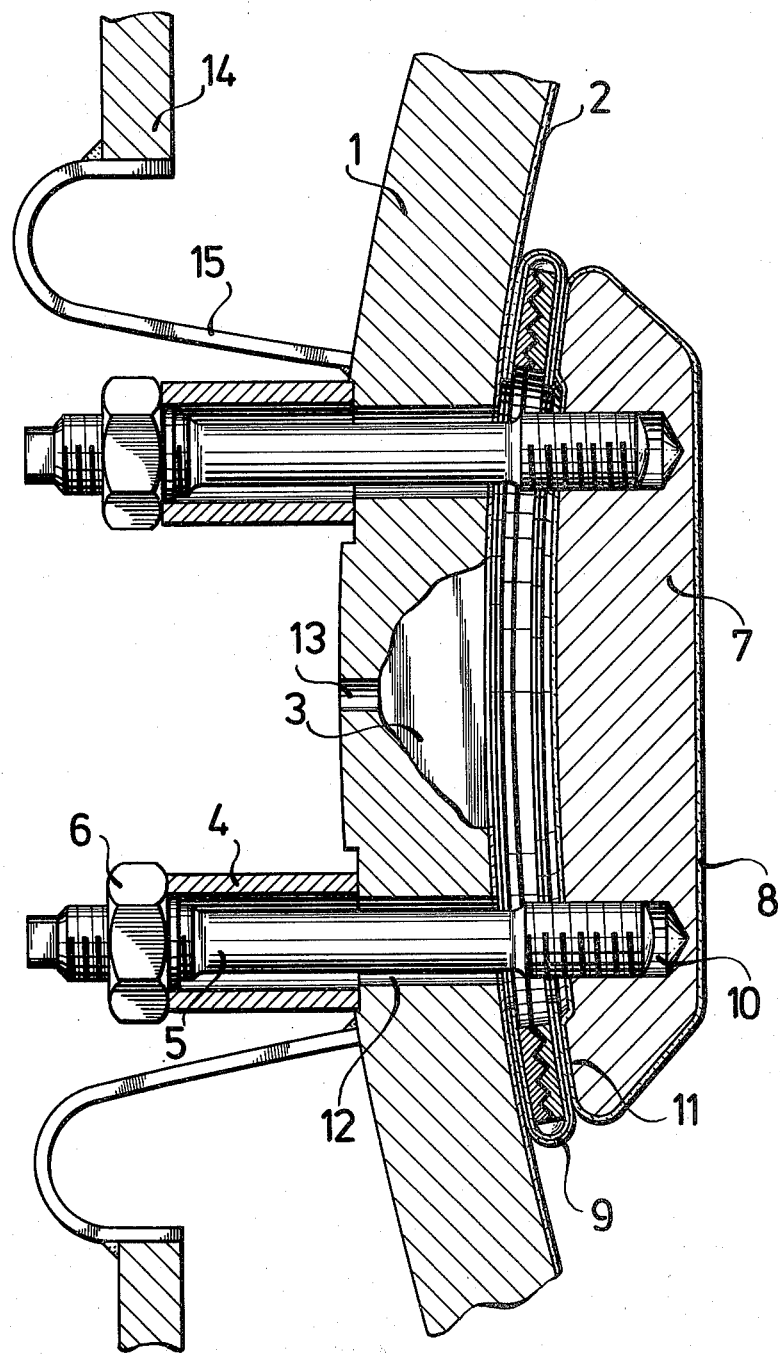

METHOD OF REPAIRING A DEFECTIVE COATED WORKPIECE

This invention provides a method for repairing a defective coated workpiece, especially a jacketed enameled container.

Expensive materials are normally required to be used in industry in all those cases in which corrosive substances are to handled. In order to enable effective use to be made of the good properties of steel in the treatment of corrosive substances, it has been a customary procedure to apply an enamel, plastics or corrosion resistant metal coating to the steel surface area so as to protect it against corrosion.

One of the disadvantages which are encountered in connection with the protection against corrosion just described resides in the fact that especially an enamel coating is highly susceptible to the action of shearing stresses. Under the action of even minor impact stress or pressure shock an enamel coating tends to stress cracking. In the end, the enamel coating is found to chip off leaving an unprotected steel surface open to corrosion.

Is is generally accepted that defects, which are detectable not earlier than during the use of a coated workpiece, occur as early as during the coating operation. It is more particularly known that pores tend to be formed in a baked enamel coating where the base metal presents microscopically small defects. These are pores which cannot reliably be determined neither by X-ray nor ultrasonic investigation. This is the reason why various methods for repairing defective coated workpieces have been tried in industry.

In one of these prior methods, the defective area is cleaned and subsequently repaired by means of a hardening plastics emulsion or a hardening cement composition. While this operation is easy to carry out, which is desirable, the fact remains that a steel surface cannot reliably be protected against corrosion by means of plastics materials which are commonly less strong and less resistant to chemicals than steel.

In another known method use is made of a sealing cap of resistant material which is placed upon the defective area. To this end, a thread is carved in the base material and a screw bolt is secured therein. In the event of the defective area being relatively small, a cap nut is screwed on to the screw bolt together with a packing ring of plastics material sealing off the cap nut from the unimpaired coating of the workpiece. In the event of the defective area being relatively large, use is made of a sealing bell which is forced against the unimpaired coating of the workpiece by means of a cap nut. Once again, a packing ring or gasket of plastics material is used to seal off the sealing bell from the coated workpiece, the cap nut being provided with a cutting edge sealing it off from the sealing bell. The hollow interior of the sealing bell is filled with a cementing composition. This method enables a workpiece to be repaired without the need to dismantle it, but it does not permit the repaired area to be controlled for leaks which is unsatisfactory as these are liable to give rise to corrosion of the base material, which, in the end may cause the whole sealing cap to be moved away from the workpiece.

A third method which is used for the repair of large-surfaced defective areas provides for the workpiece to be re-enameled. Needless to say it is necessary to have the entire workpiece re-enameled as it is technically not possible to re-enamel just the defective area. In other words, it is necessary to transport the defective workpiece to a metal enamel facility and have it re-enameled by a method which incidentally does not always ensure that the re-enameled workpiece is actually free from pores. If no suitable reserve workpiece is available, it is necessary to stop production facilities during the repair period. In the event of the workpiece to be repaired being a jacketed enameled container, it is additionally necessary first to dismantle the jacket and later to re-weld it to the repaired workpiece.

The methods described hereinabove, wherein use is made of the most various types of sealing caps, are scarcely suitable for the repair of a jacketed container. In the event of the repaired place being not absolutely tight, it is possible for the medium inside the container to intermix in uncontrolable manner with the medium occupying the space left between the container and jacket, which is undesirable.

It is therefore an object of the present invention to provide a method for the repair especially of a jacketed container which (a) is easy to carry out rapidly, (b) leaves the chemical resistance of the container unimpaired, and (c) permits the repaired surface to be controlled for leakiness from the outside.

The present invention relates more particularly to a method of repairing defects in the interior enamel coating of an enameled container comprising covering and overlapping the defective coating area with an enamel coated plate having a seal disposed between the defective coating area and said plate, and securing the plate by means of bolts or screws extending through the container wall from the uncoated side and extending into the plate.

The invention also relates to a method of repairing defects in the interior enamel coating of a jacketed container comprising removing a suitable portion of the container jacket opposite the enamel defect, attaching a compensator to the jacket and inner wall of the container, providing a control bore in the inner wall at the defect site, covering and overlapping the defective coating area with an enamel coated plate having a seal disposed between the defective coating area and said plate, and securing the plate by means of bolts or screws extending through the inner container wall from the uncoated side and extending into the plate.

Further features of the present invention provide:
(a) for one or more, preferably 3 or 4, non-through-going threaded holes to be carved in the reverse side of the plate for securing the bolts or screws therein;
(b) for the peripheral sealing portion of the plate to be made thicker than the plate itself in order to even more tightly secure the plate to the defective surface;
(c) for the bolts or screws to be secured to the uncoated side of the workpiece by means of a spacer or nut;
(d) for the spacer to comprise a spring, preferably a set of cup springs;
(e) for the seal to be of chemically resistant material, preferably of elastic plastics material, more preferably of polyfluoroethylene;
(f) for the plastics material to be internally reinforced by means of a metal;
(g) for the coated workpiece to be provided with a through-going control bore permitting the repaired surface area to be tested for leaks; and (h) for a compensator to be welded to the jacket, the compensator permitting the jacket to be fluid-tightly connected to the workpiece and permitting the control bore to be inspected from the outside.

The repair method of this invention will now be described with reference to the accompanying drawing showing a jacketed enameled container.

A plurality of plates 7 of different size with a suitable sealing surface 11 are provided with an enamel coating 8 and kept ready for repair of defective workpieces. Depending on the size of each plate 7, one or more, preferably four non-through-going threaded holes 10 are carved in the sealing surface of the respective plate 7.

The defective area 3 is first cleaned, then treated with a cementing composition and a control bore 13 is bored into the container 1. Marked on the container 1 are the places for the bores 12 which correspond to the threaded holes provided in the plate 7, which is placed on the defective area 3 so as to cover and overlap it. Next, the container 1 and the jacket 14 are bored through to provide the bores 12. Carved in the jacket 14, centrically around the bores 12, is a circle which receives a compensator 15. The bolts or screws 5 are tightened in the threaded holes 10 provided in the plate 7. The bolts or screws secured to the plate 7 which has a seal 9 applied to its surface 11 are then passed through the bores 12. The spacers 4 whose length is selected in accordance with the length of the bolts or screws 5 are slipped over the latter which are then fixed by means of the nuts 6. These are alternately and uniformly tightened until the container 1 and the plate 7 are fluid-tightly connected together through the seal provided between the coated side 8 of the plate 7 and the coated side 2 of the container 1. One end of the compensator 15 is welded to the peripheral portion of the circle carved in the jacket 14, the opposite end being welded to the workpiece 1, around the defective area 3.

We claim:

1. A method of repairing a defective coating area on the interior enamel-coated wall of a container comprising the steps of covering the defective coating area with a smooth enamel-coated plate having a greater area than the defective area in a manner which overlaps sound enamel coating, disposing a sealing medium between the outer periphery of the plate and the sound coating surrounding the defective area within the confines of the plate, extending fasteners through the wall of the container into a side of the plate disposed adjacent the interior wall without penetrating the enamel coating on the opposite side of the plate, and firmly securing the fasteners against the outer wall of the container in a manner which urges the plate and sealing medium into firm sealing contact against the inner wall of the container whereby a smooth enamel coating is restored to the interior wall of the container.

2. A method as set forth in claim 1, wherein the fasteners comprise studs having a pair of threaded ends, blind threaded bores extending into the side of the plate disposed adjacent the interior coated wall of the container, sleeves are disposed about the ends of the studs projecting outside of the container wall in edge contact with the wall, and nuts are disposed and tightened on the outer ends of the studs in edge contact with the outer ends of the sleeves for pulling the plate and sealing medium into firm sealing contact with the interior wall of the container.

3. A method as set forth in claim 2, wherein the studs have flats on their extreme outer ends for facilitating insertion into the blind threaded bores in the enamel plate.

4. A method as set forth in claim 1, wherein a jacket is disposed on the outside of the container wall, a portion of the jacket adjacent the defective area of the coating being removed, the fasteners extending through the removed portion of the jacket, and a damming compensator being attached between the jacket and the outer wall of the container to preserve the integrity of the rest of the jacket.

5. A method as set forth in any one of claims 1 or 6, wherein a control bore is provided through the inner wall of the container and extending into the defective area whereby leakage through the sealing medium can be detected from outside of the container.

* * * * *